United States Patent [19]

Jens

[11] Patent Number: 5,450,056

[45] Date of Patent: Sep. 12, 1995

[54] METHOD AND APPARATUS FOR COMPARING TWO NUMBERS

[75] Inventor: Larry A. Jens, Saratoga, Calif.

[73] Assignee: Intel Corporation, Santa Clara, Calif.

[21] Appl. No.: 174,033

[22] Filed: Dec. 27, 1993

[51] Int. Cl.6 .................................................. G06F 7/02
[52] U.S. Cl. ................................. 340/146.2; 327/64
[58] Field of Search .................... 340/146.2; 307/355

[56] References Cited

U.S. PATENT DOCUMENTS

5,281,946  1/1994  Van Le ........................... 340/146.2
5,319,347  6/1994  McClure ......................... 340/146.2

*Primary Examiner*—Margaret Rose Wambach
*Attorney, Agent, or Firm*—Blakely, Sokoloff, Taylor & Zafman

[57] ABSTRACT

A comparator circuit for comparing a first n-bit binary number to a second n-bit binary number to produce a signal indicating if the first n-bit binary number is greater than or equal to the second n-bit binary number. If the signal is in one logic state, then the first n-bit binary number is greater-than or equal to the second n-bit binary number. On the other hand, if the signal is in a second logic state, then the first n-bit binary number is not greater-than or equal to the second n-bit binary number.

14 Claims, 7 Drawing Sheets

FIG_1

FIG_2A

FIG. 2B

FIG_2C

FIG_3

FIG_4

FIG_5

FIG_6

FIG_7

FIG_8

FIG_9

METHOD AND APPARATUS FOR COMPARING TWO NUMBERS

FIELD OF THE INVENTION

The present invention relates to the field of electronic circuits; particularly, the present invention relates to an electronic circuit for performing a greater-than-or-equal-to operation or a less-than operation.

BACKGROUND OF THE INVENTION

Comparators compare two quantities against one another in order attempt to ascertain the relationship between the two quantities. For instance, comparators can be designed to check two numbers and determine if the numbers are equal or if one of the numbers is greater than or less than the other. Digital comparators are used to determine whether two binary numbers have a desired relationship (i.e., one is equal to the other, one is greater than the other or one is less than the other).

In a digital comparator, two binary numbers are considered equal if all of the corresponding bits of the two numbers are identical. Typically, a comparator produces a logical 1 on its output if the numbers are equal. If the numbers are not equal, the comparator typically produces a logical 0. In a typical comparator, each of the n-bit numbers are compared bit-by-bit with the outputs of each bit-by-bit comparison being combined by an AND gate. In other words, these comparators operate by comparing the bits of one number to the bits in the same bit positions in the other number.

Comparators are often used in a wide variety of applications. For instance, comparators are often used in computer systems to compare addresses, tags, values and other quantities. The uses of comparison electronics in computer systems is often on the critical path, such that actions are dependent on the results produced by the comparisons. Therefore, the results of the comparison are needed as quickly as possible. Thus, it is desirable to be able to perform a comparison very fast.

The present invention provides comparison circuitry which provides a fast comparison between two n-bit binary numbers without the need for a clock signal. The comparison circuitry of the present invention compares numbers and produces an output indicating whether one of the numbers is greater-than-or-equal-to the other number.

SUMMARY OF THE INVENTION

A method and apparatus for comparing two n-bit binary numbers is described. The method and apparatus of the present invention includes a first circuit for producing a first set of equal indication signals and a first set of greater-than indication signals. The first circuit includes multiple sub-circuits that each produce an equal indication signal and a greater-than indication signal in response to m-bits of said first n-bit number and m-bits of said second n-bit number. In one embodiment, m is 8 and n is 32. A second circuit produces a final equal indication signals in response to the first set of equal indication signals. The final equal indication signal indicates whether the first n-bit number is equal to the second n-bit number. A third circuit produces a final greater-than indication signal in response to the first set of greater-than indication signals and at least one of the first set of equal signals. The final greater-than signal indicates whether the first n-bit number is greater than the second n-bit number. A fourth circuit produces a third signal indicating whether the first n-bit number is greater than or equal to the second n-bit number in response to the final equal indication signal and the final greater-than indication signal.

In one embodiment, the sub-circuits include multiple 2-bit wide comparison circuitry to compare two bits from each address and generate signals indicating whether the two bits are equal or whether the first two bits are greater-than the second two bits.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

DETAILED DESCRIPTION OF THE PRESENT INVENTION

A digital comparator for comparing binary numbers is described. In the following detailed description of the present invention numerous specific details are set forth, such as specific transistor dimensions, numbers of bits, signal logic levels, etc., in order to provide a thorough understanding of the present invention. However, it will be understood to one skilled in the art that the present invention may be practiced without these specific details. In other instances, well-known structures and devices are shown in block diagram form, rather than in detail, in order to avoid unnecessarily obscuring the present invention.

Overview of the Present Invention

The present invention provides a comparator to compare two binary numbers and produce a signal indicating if one of the binary numbers is greater than or equal to the second binary number. The present invention provides the comparison using certain configurations of complex gates to reduce the propagation time through the comparator and to reduce the number of transistors required to implement the greater-than-or-equal-to function.

Figure 1:
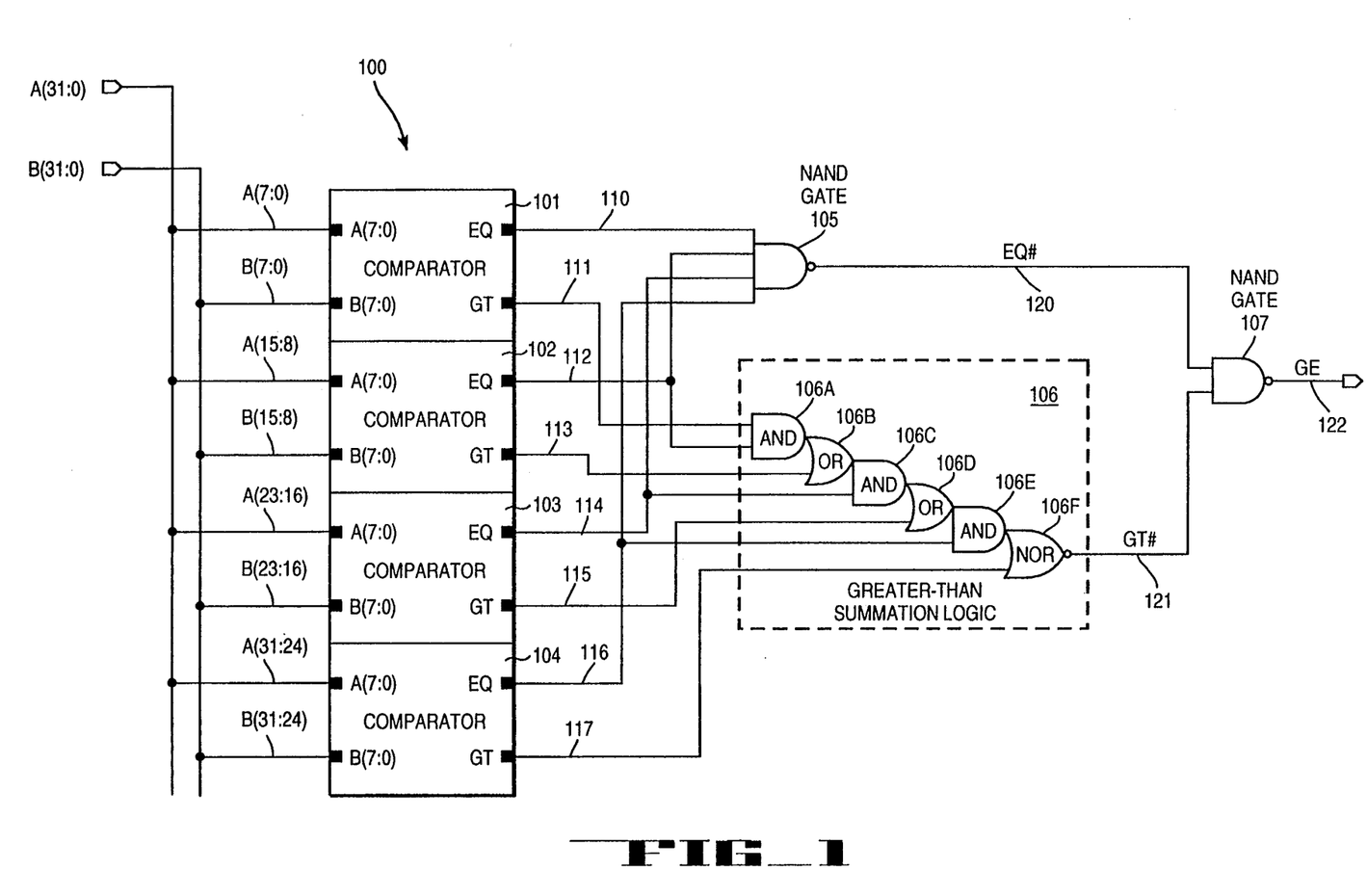
FIG. 1 is a circuit schematic of the comparison circuitry of the present invention.

FIG. 1 illustrates one embodiment of a 32-bit comparator of the present invention. Although the comparator is shown as a 32-bit comparator, the present invention is not limited to performing 32-bit comparisons and other size comparisons may be implemented in comparison circuitry employing the same teachings of the present invention.

Referring to FIG. 1, 32-bit comparator is shown having 8-bit comparator blocks 101–104, NAND gate 105, greater than summation logic 106 and NAND gate 107. The 32-bit comparator 100 compares two 32-bit binary numbers, referred to in FIG. 1 as A[31:0] and B[31:0], where [31:0] symbolizes 32 bits beginning with the most significant bit 31, through the least significant bit 0. Each of comparator blocks 101–104 are coupled to receive 8 bits of each of the numbers A[31:0] and B[31:0] and each generates two signals. One of the signals generated indicates whether the bits of each of the numbers in the comparison are equal, and the other signal generated indicates whether one of the number is greater than the other number.

Comparator block 101 is coupled to receive the lower 8 significant bits of each of number A and number B and outputs signals 110 and 111 indicating whether the addresses are equal or whether those 8 bits of number A are greater than those 8 bits of number B, respectively. Comparator block 102 is coupled to receive bits 8–15 of each of numbers A and B and outputs signals 112 and 113. Signal 112 indicates whether bits 8–15 of numbers A and B being are equal, while signal 113 indicates whether the 8 bits of number A are greater than the 8 bits of number B input into comparator block 102. Comparator block 103 is coupled to receive bits 16–23 of numbers A and B for comparison. Comparator block 103 generates signal 114 indicating whether bits 16–23 of number A are equal and to bits 16–23 of number B and signal 115 indicating whether bits 16–23 of the number A are greater than bits 16–23 of number B. Comparator block 104 is coupled to receive the 8 most significant bits [31:24] of numbers A and B and determines whether they are greater than or equal with respect to one another. Comparator block 104 generates signals 116 indicating whether bits 24–31 of numbers A and B are equal and signal 117 indicating whether bits 24–31 of number A are greater than bits 24–31 of number B.

Signals 110, 112, 114 and 116 are coupled to the inputs of NAND gate 105. The output of NAN D gate 105, the EQ# signal 120, is coupled to the input of NAND gate 107. The output of NAND gate 107 is a signal which indicates whether the number A is greater-than-or-equal-to the number B. The other input of NAND gate 107 is coupled to the output of greater-than summation logic 106. More particularly, the other input of NAND gate 107 is coupled to GT# signal 121 which is output from NOR gate 106F.

The inputs to NOR gate 106F are coupled to the output of AND gate 106E and signal 117. The inputs to AND gate 106E are coupled to signal 116 and the output of OR gate 106D. The greater than indication signal 115 and the output of AND gate 106C are coupled to the inputs of OR gate 106D. The inputs to AND gate 106C are coupled to signal 114 and the output of OR gate 106B. The inputs of OR gate 106B are coupled to signal 113 and the output of AND gate 106A. The inputs of AND gate 106A are coupled to signals 111 and 112.

Each of comparators 101–104 compares 8 bits of numbers A and B. Although comparator 100 is designed for a 32-bit comparison, the present invention could be configured for comparisons of other bit amounts, such as 20 bit comparisons, 18 bit comparisons, etc. Each of comparator blocks 101–104 are designed to compare 8 bits of number A to their corresponding 8 bits in number B and produce signals indicating whether those bits are equal or whether the bits of number A are greater than the bits of number B. Although in the present invention, each of the comparator blocks 101–104 are designed to compare 8 bits, the present invention is not limited to having comparator blocks that accommodate 8 bits. In other embodiments, comparator blocks 101–104 may be designed to compare 1 bit, 2 bits, 4 bits or any number of bits.

NAND gate 105 receives all the signals from comparator blocks 101–104 that indicate whether the number bits are equal and produces a composite equal signal, equal (EQ#) signal 120. In the following discussion, the "#" sign indicates a signal that is active low. The EQ# signal 120 is an active low signal that indicates whether all of the bits in binary number A are equal to all the bits in binary number B. If signals 110, 112, 114 and 116 are all logical 1, the EQ# signal 120 (i.e., the output of NAND gate 105) will be low, thereby indicating that the bits in number A are equal to the bits in number B.

Greater-than and summation logic 106 receives signals 111–117 and indicates whether the bits in number A are greater than the bits in number B. The greater-than signal 121 is active low, such that when the output of NOR gate 106F is low, the bits in number A are greater than the bits in number B.

In one embodiment, the output of NOR gate 106F is low if either the greater-than indication signal 117 is a logical 1 (indicating bits 31–24 of number A are greater than bits 31–24 of number B) or the output of AND gate 106E is a logical 1. The output of AND gate 106E is a logical 1 when the equal indication signal 116 is a logical 1 (indicating bits 31–24 of numbers A and B are equal) and the output of OR gate 106D is a logical 1. The output of OR gate 106D is a logical 1 if either the greater-than indication signal 115 is a logical 1 (indicating bits 23–16 of number A are greater than bits 23–16 of number B) or the output of AND gate 106C is a logical 1. The output of AND gate 106C is a logical 1 if equal indication signal 114 is a logical 1 (indicating bits 23–16 of numbers A and B are equal) and the output of OR gate 106B is a logical 1. The output of OR gate 106B is a logical 1 if either the greater-than indication signal 113 is a logical 1 (indicating bits 15–8 of number A are greater than bits 15–8 of number B) or the output of AND gate 106A is a logical 1. The output of AND gate 106A is a logical 1 if both equal indication signal 112 (indicating bits 15–8 of numbers A and B are equal) is a logical 1 and greater-than indication signal 111 is a logical 1 (indicating bits 7–0 of number A are greater-than bits 7–0 of number B).

The greater-than-or-equal-to signal 122 output from NAND gate 107 is an active high signal, such that the output of a NAND gate 107 indicates that binary number A is greater-than or equal to binary number B when the output signal (GE) 122 is high. The output of NAND gate 107 is high when either the equal (EQ#)indication signal 120 or the greater-than (GT#) indication signal 121 is low. In this manner, if the bits are equal as indicated by the output of NAND gate 105 or if the bits in number A are greater than the bits in number B as indicated by the output of greater-than summation logic 106, then the output of NAND gate 107 is high.

It should be noted that in one embodiment, comparator 100 is comprised of circuit components fabricated using complementary metal-oxide semiconductor (CMOS) material.

Comparator 100 shown in FIG. 1 only requires 5 gate delays from input to output. Comparator blocks 101–104 require 3 gate delays, while greater-than summation logic 106 and NAND gate 105 each have 1 gate delays and NAND gate 107 has one gate delay. Thus, the comparator of the present invention provides an advantage over the comparators of the prior art.

One of the advantages of the comparator of the present invention is that due to having a large number of inputs reduced to one output, the fan out of the signals is low. Because the fan out of the signals is low, a small sized transistor device may be used in the comparator circuit. Because the comparator may be implemented with small transistors, the area required on an integrated circuit die for the comparator circuitry of the present invention may be reduced.

Figure 2A:
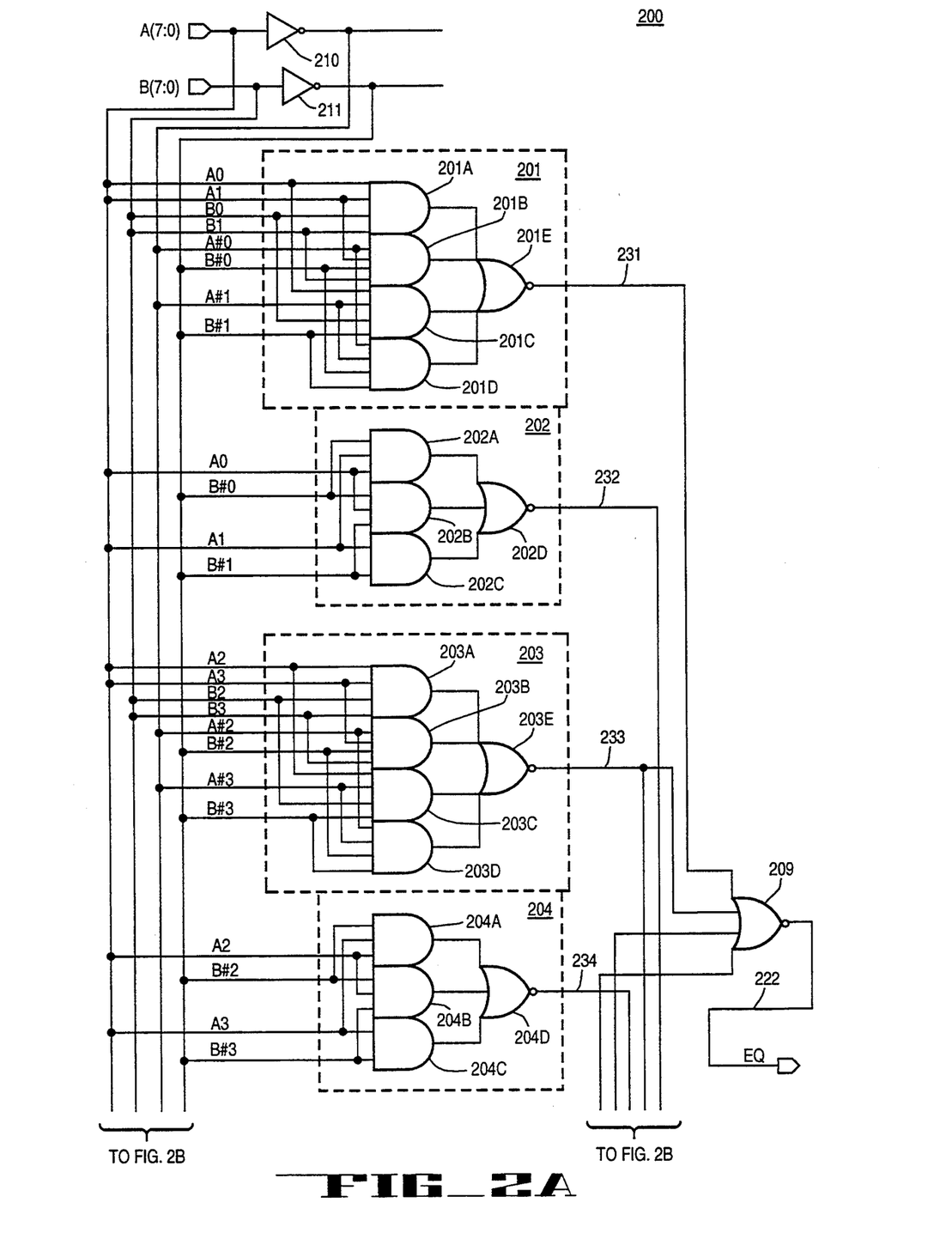
FIGS. 2A–2C are circuit schematics of one comparison block of the comparator of the present invention.
Figure 2B:
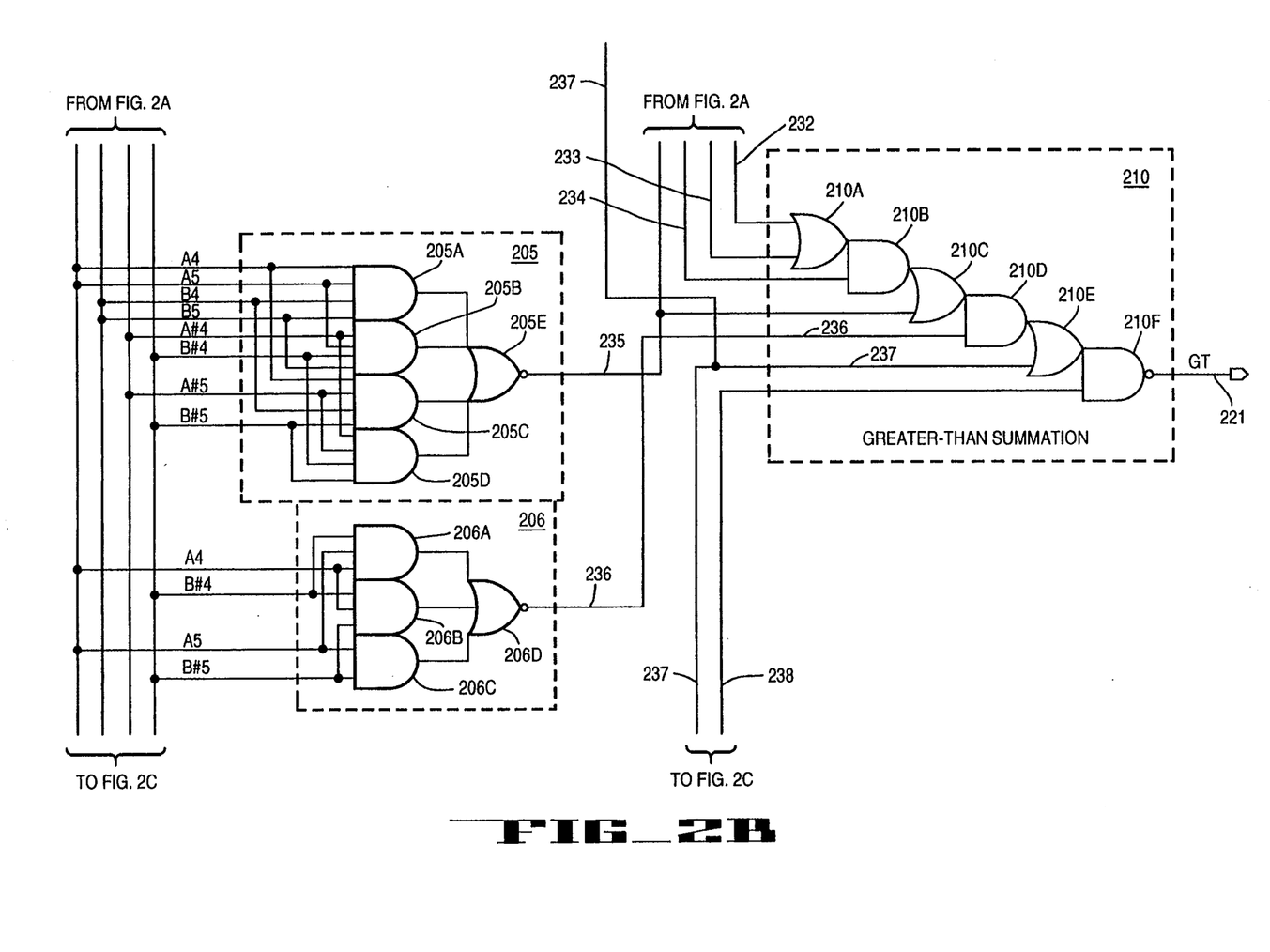
Figure 2C:
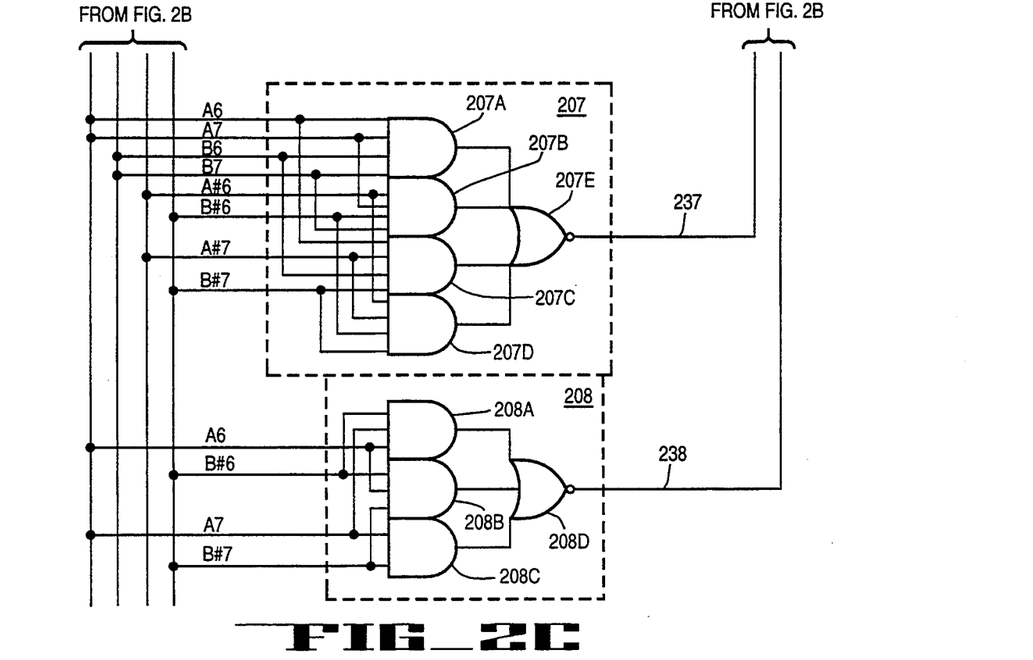

FIG. 2 illustrates one embodiment for each comparator block 101–104. Referring to FIG. 2, comparator block subcircuit 200 comprises inverters 210–211, 2-bit equal comparison subcircuits 201, 203, 205 and 207, two-bit greater-than comparison subcircuits 202, 204, 206 and 208, NOR gate 209 and greater-than summation subcircuit 210. Inverters 210–211 each comprise eight inverters.

In one embodiment, each of the 2-bit equal subcircuits 201, 203, 205 and 207 are identical. Each of the 2-bit equal comparison subcircuits 201, 203, 205 and 207 are comprised of four AND gates and one NOR gate. Similarly, in one embodiment, all of greater-than subcircuits 202, 204, 206 and 208 are identical. The two-bit greater-than comparison subcircuits 202, 204, 206 and 208 are comprised of three AND gates and one NOR gate. The operation of these AND and NOR gates is well-known in the art. The greater than summation subcircuit 210 is comprised of OR gates 210A, 210C and 210E, AND gates 210B and 210D and NAND gate 210F.

The input to inverters 210 and 211 are coupled to receive the eight bits of numbers A and B respectively. These eight bits are designated [7:0] but could be bits 7–0, 15–8, 23–16, 31–24, etc. Note that although inverters 210 and 211 are shown as single inverters, in actuality, there are eight separate inverters, one for each of the eight bits of numbers A and B.

The 2-bit equal comparison subcircuit 201 is coupled to receive the bits A0, A1, B0, B1 and their inverted values to produce equal indication signal 231. The AND gate 201A is coupled to receive the A0, A1, B0 and B1 bit signals. The output of AND gate 201A is coupled to one input of NOR gate 201E. The other input of NOR gate 201E is coupled to the output of AND gate 201B. The inputs to 201B are coupled to the inverted A0 (A#0) bit signal, the A1 bit signal, the inverted B0 bit signal and the B1 bit signal. Another input to NOR gate 201E is coupled to the output of AND gate 201C. The inputs to AND gate 201C are coupled to the A0 bit, the inverted A1 (A#1) bit signal, the B0 bit signal and the inverted B1 (B#1) bit signal. Another input of NOR gate 201E is coupled to the output of AND gate 201D. The inputs of AND gate 201D are coupled to the inverted A0 (A#0) bit signal, the inverted A1 (A#1), the inverted B0 (B#0) bit signal and the inverted B1 (B#1) bit signal. The 2-bit equal comparison subcircuit 203 is coupled to bit signals A2, A3, B2, B3, A#2, A#3, B#2 and B#3 in the same manner as bit signals A0, A1, B0, B1 and their inversions A#0, A#1, B#0, B#1 are coupled within subcircuit 201 respectively. The 2-bit equal comparison subcircuit 205 is coupled to bit signals A4, A5, B4, B5, A#4, A#5, B#4, and B#5 in the same manner as bit signals A0, A1, B0, B1 and their inversions A#0, A#1, B#0, B#1 are coupled within subcircuit 201 respectively. The 2-bit equal comparison subcircuit 207 is coupled to bit signals A6, A7, B6, B7, A#6, A#7, B#6, and B#7 in the same manner as bit signals A0, A1, B0, B1 and their inversions A#0, A#1, B#0, B#1 are coupled within subcircuit 201 respectively.

The 2-bit greater-than comparison circuit 202 is coupled to receive the signals A0, A1, B#0 and B#1 to produce the output signal 232 which indicates that A0 and A1 bit signals are greater than the B0 and B1 bit signals. Specifically, the greater-than signal 232 is the output of the NOR gate 202D. The inputs of NOR gate 202D are coupled to the outputs of AND gates 202A–202C. The inputs of AND gate 202A are coupled to the signals A0, B#0 and A1. The inputs to AND gate 202B are coupled to the signals A0, B#0 and B#1. The inputs to AND gate 202C are coupled to the signals A1 and B#1. The circuit components of 2-bit greater than comparison subcircuits 204, 206 and 208 are coupled in the same manner as those of subcircuit 202, except that subcircuit 204 is coupled to receive the signals A2, A3, B#2 and B#3 and produces the greater-than indication signal 234, subcircuit 206 receives the signals A4, A5, B#4, B#5 to produce the greater-than indication signal 236, and subcircuit 208 receives the signals A6, A7, B#6 and B#7 and produces the greater-than indication signal 238.

All of the equal indication signals from the 2-bit equal comparator subcircuits 201,203, 205 and 207 are coupled to the inputs of NOR gate 209. That is, equal indication signals 231,233, 235 and 237 are coupled to the inputs of NOR gate 209. The output of NOR gate 209 is the composite equal indication (EQ) signal 222 indicating that all the bits of input A[7:0] are equal to the bits of input B[7:0].

The greater-than indication (GT) signal 221 is output from greater than summation block 210 as the output of NAND gate 210F. The greater than indication signal 238 is coupled to one input of NAND gate 210F. The other input of NAND gate 210F is coupled to the output of OR gate 210E. The inputs to OR gate 210E are coupled to the equal indication signal 237 and the output of AND gate 210D. The inputs to AND gate 210D are coupled to the greater than indication signal 236 and the output of OR gate 210C. The inputs to OR gate 210C are coupled to the equal indication signal 235 and the output of AND gate 210B. The inputs to AND gate 210B are coupled to the greater than indication signal 234 and the output of OR gate 210A. The inputs to OR gate 210A are coupled to the equal to indication signal 233 and the greater than indication signal 232.

Each of the 2-bit equal comparison subcircuits 201,203, 205 and 207 determine whether the bits input for their comparison are equal. If the two bits of binary numbers A and B that are input for comparison are equal, the output of the particular subcircuit is a logical 0. On the other hand, if the two bits of numbers A and B are not equal, the equal indication signal will be a logical 1. For instance, if bits A0 and A1 are not equal to bits B0 and B1 respectively, the output indication signal 231 is a logical 1. On the other hand, if bits A0 and A1 are equal to bits B0 and B1, the output indication signal 231 is a logical 0.

If the output indication signals 231, 233, 235 and 237 all indicate that their corresponding bits are equal, and thus are all a logical 0, the output of NOR gate 209 is a logical 1, thereby indicating that the bits are equal. However, if any one of the output indication signals 231, 233, 235 or 237 is a logical 1, indicating that their two bits are not equal, then the output of NOR gate 209 will be a logical 0, thereby indicating that the bits being compared are not equal.

The 2-bit greater than comparison subcircuit 202 determines whether the bits A0 and A1 are greater than the bits B0 and B1. If the bits A0 and A1 are greater than bits B0 and B1, the output indication signal 232 output from subcircuit 202 is a logical 0. On the other hand, if bits A0 and A1 are not greater than bits B0 and B1, then the output indication signal 232 output from subcircuit 202 is a logical 1.

Similarly, subcircuit 204 determines whether bits A2 and A3 are greater than bits B2 and B3. If bits A2 and A3 are greater than bits B2 and B3, the output indication signal 234 is a logical 0. On the other hand, if bits A2 and A3 are not greater than bits B2 and B3, then the output indication signal 234 will be a logical 1. Subcircuit 206 determines whether bits A4 and A5 are greater than bits B4 and B5. If bits A4 and A5 are greater than bits B4 and B5, the output indication signal 236 output from subcircuit 206 is a logical 0. On the other hand, if bits A4 and A5 are not greater than bits B4 and B5, the output indication signal 236 output from subcircuit 206 is a logical 1. Subcircuit 208 indicates whether bits A6 and A7 are greater than bits B6 and B7. If bits A6 and A7 are greater than bits B6 and B7, the output indication signal 238 output from subcircuit 208 will be a logical 0. On the other hand, if address bits A6 and A7 are not greater than bits B6 and B7, the output indication signal 238 output from subcircuit 208 is a logical 1.

Greater than summation subcircuit 210 sums all of the greater than indication signals from subcircuits 202, 204, 206 and 208 with the equal indication signal from subcircuits 203, 205 and 207 to produce a single greater than indication signal 221 indicative of whether all 8 bits of input number A are greater than all 8 bits of input number B. If the 8 bits of number A are greater than the 8 bits of number B, the greater than indication signal 221 is a logical 1. On the other hand, if the 8 bits of number A are not greater than the 8 bits of number B, then the greater than output indication signal 221 is a logical 0.

Specifically, with respect to the greater than summation subcircuit 210, the greater than indication signal 221 is the output of the NAND gate 210F. The output of NAND gate 210F is a logical 1 if either the greater than indication signal 238 is a logical 0 or the output of OR gate 210E is a logical 0. The output of OR gate 210E is a logical 0 if the equal to indication signal 237 is a logical 0 (indicating that bits A6 and A7 are equal to bits B6 and B7) and the output of AND gate 210D is a logical 0. The output of AND gate 210D is a logical 0 if the greater than indication signal 236 is a logical 0 (indicating that bits A5 and A4 are greater than bits B5 and B4) or the output of OR gate 210C is a logical 0. The output of OR gate 210C is a logical 0 if the equal to indication signal 235 is a logical 0 (indicating that bits A5 and A4 equal to bits B5 and B4) and the output of AND gate 210B is a logical 0. The output of AND gate 210B is a logical 0 if the greater than indication signal 234 is 0 (indicating bits A3 and A2 are greater than bits B3 and B2) or if the output of OR gate 210A is a logical 0. The output of OR gate 210A is a logical 0 if both the equal to indication signal 233 is a logical 0 (indicating that bits A3 and A2 are equal to bits B3 and B2) and the greater than indication signal 232 is a logical 0 (indicating that bits A1 and A0 are greater than bits B1 and B0).

Therefore, using four 2-bit equal to comparison subcircuits 201, 203, and 207 and four 2-bit greater than subcircuits 202, 204, 206 and 208 in conjunction with greater than summation circuit 210 and NOR gate 209, the 8-bit comparison circuit 200 produces an equal to indication signal 222 indicating whether the 8 bits of numbers A and B that are received as inputs are equal and produces a greater than indication signal 221 indicating whether the 8 bits of number A and B are greater than the 8 bits of number B received as an input.

Although the 8 bit comparisons are shown implemented using 2-bit comparisons, two four-bit comparisons or eight single comparisons may be performed using the teachings of the present invention.

The 8-bit comparison circuit 200 has three gate delays. The inverters 210 and 211 produce one gate delay, while the equal to subcircuits 201, 203, 205 and 207 and the greater than comparison subcircuits 202, 204, 206 and 208 have one delay. Summation subcircuit 210 and NOR gate 209 also have a one gate delay. In one embodiment, the 8-bit comparison circuit 200 could avoid one gate delay if the number bits are already inverted upon being input to the subcircuits.

By producing an indication of A greater-than-or-equal to B, also implies that B is less-than-or-equal to A (without swapping the inputs); thus, the present invention may be used as a less-than-or-equal to circuit. This circuit also can be used for an active low less-than circuit, A less-than B, such that when A is less than B, a logic 0 will appear on the output.

Figure 3:
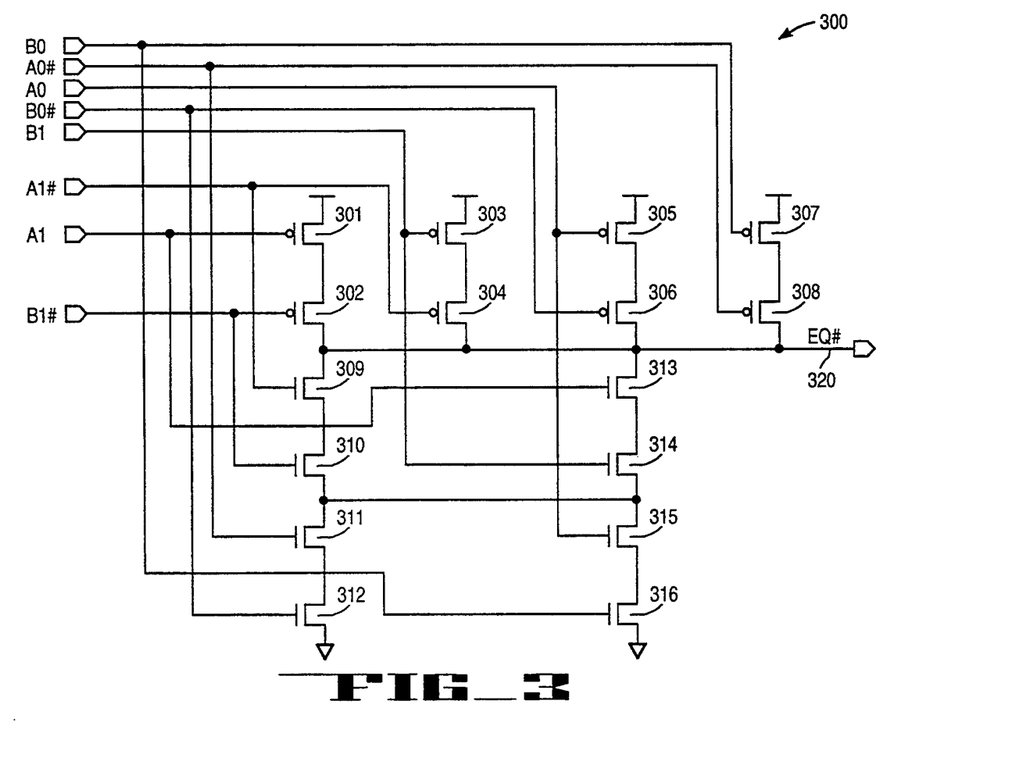
FIG. 3 is a circuit schematic for producing a signal indicating whether two 2-bit inputs are equal.

One implementation of 2-bit equal two comparison subcircuits 201, 203, 205 and 207 is shown in FIG. 3. Referring to FIG. 3, the 2-bit equal to comparison circuit is comprised of p-channel transistors 301–308 and n-channel transistors 309–316. In one embodiment, each of the PMOS transistors 301–308 has a channel width of 7.3 microns and a channel length of 0.7 microns, while the NMOS transistors 309–316 have a channel width of 5.7 microns and a channel length of 0.7 microns.

The source of transistor 301 is coupled to the supply voltage Vcc. The gate of transistor 301 is coupled to the input signal A1. The drain of transistor 301 is coupled to the source of transistor 302. The gate of transistor 302 is coupled to the B1# input signal. The drain of transistor 302 is coupled to the equal to indication signal 320. The source of transistor 303 is coupled to the supply voltage Vcc. The gate of transistor of 303 is coupled to input signal B1, and the drain of transistor 303 is coupled to the source of transistor 304. The gate of transistor 304 is coupled to the A1# input signal. The drain of transistor 304 is coupled to the equal to indication signal 320. Transistors 305 and 306 are coupled in series between the supply voltage Vcc on the source of transistor 305 and the equal to indication signal 320 coupled to the drain of transistor 306. The gate of transistor 305 is coupled to A0 input signal and the gate of transistor 306 is coupled to the B0# input signal. Transistors 307 and 308 are coupled in series between the supply potential Vcc at the source of transistor 307 and the equal to indication signal 320 coupled to the drain of transistor 308. The gate of transistor 307 is coupled to the B0 input signal and the gate of transistor 308 is coupled to the A0# input signal.

Transistors 309–312 are coupled in order and in series between the equal to indication signal 320 coupled to the drain of transistors 309 and ground (Vss) coupled to the source of transistor 312. The gate of transistor 309 is coupled to the A1# input signal. The gate of transistor 310 is coupled to the B1# input signal. The gate of transistor 311 is coupled to the A0# input signal and the gate of transistor 312 is coupled to the B0# input signal. Transistors 313–316 are coupled in series between the equal to indication signal 320 and ground (Vss), where the drain of transistor 313 is coupled to the equal to indication signal 320 and the source of transistor 316 is coupled to ground. The gate of transistor 313 is coupled to the A1 input signal. The gate of transistor 314 is coupled to the B1 input signal. The gate of transistor 315 to the A0 input signal, and the gate of transistor 316 is coupled to the B0 input signal.

The PMOS transistors 301–308 are utilized to pull the equal to indication signal 320 to a logical 1 when the input bits A0 and A1 are not equal to the input bits B0 and B1. The NMOS transistors 309–316 are used to pull the equal to indication signal 320 to a logical 0 (e.g., ground) when the input bits A0 and A1 are equal to the input bits B0 and B1. Each of the series p-channel transistor pairs (301–302, 303–304, 305–306 and 307–308) is capable of pulling the equal to indication signal 320 to a logical 1 while each of the series NMOS transistors stacks (309–312 and 313–316) are capable of pulling the equal output indication signal to ground. An exemplary set of inputs is shown in Table 1 below.

TABLE 1

| | A0 | A0# | A1 | A1# | B0 | B0# | B1 | B1# | EQ# |
|---|---|---|---|---|---|---|---|---|---|
| Set 1 | 0 | 1 | 0 | 1 | 0 | 1 | 0 | 1 | 0 |
| Set 2 | 0 | 1 | 1 | 0 | 0 | 1 | 0 | 1 | 1 |
| Set 3 | 0 | 1 | 0 | 1 | 1 | 0 | 0 | 1 | 1 |

For instance, if the first set of inputs are input into the 2-bit equal to comparison subcircuit 300, then at least one transistor in each of the PMOS series transistor pairs 301–302, 303–304, 305–306 and 307–308 is off, such that the equal to indication signal 320 is not pulled to a logical 1. However, all of transistors 309–312 are on such that the transistor stack pulls the equal to indication signal 320 to a logical 0, thereby indicating that the inputs A0 and A1 are equal to the inputs B0 and B1 (as shown in Table 1). However, if the second set of inputs is input into subcircuit 300, PMOS transistors 303 and 304 are on and pull the output indication signal 320 to a logical 1, thereby indicating that the input signals A0 and A1 are not equal to input signals B0 and B1.

If the third set of inputs is received by subcircuit 300, both the PMOS transistor 305 and 306 are on, causing the equal indication signal 320 to be pulled to a logical 1. Also, at least one of each of the NMOS transistor 309–310, 311–312, 313–314, and 315–316 is off, such that neither transistor stack pulls signal 320 to ground. In this manner, subcircuit 300 indicates that the A0 and A1 input signals are not equal to the B0 and B1 input signals.

Subcircuit 300 utilizes less gates than that required to performed the same function in the prior art. Furthermore, subcircuit 300 is a complex circuit such that it only takes one gate delay to produce the output, the equal to indication signal 320.

Figure 4:
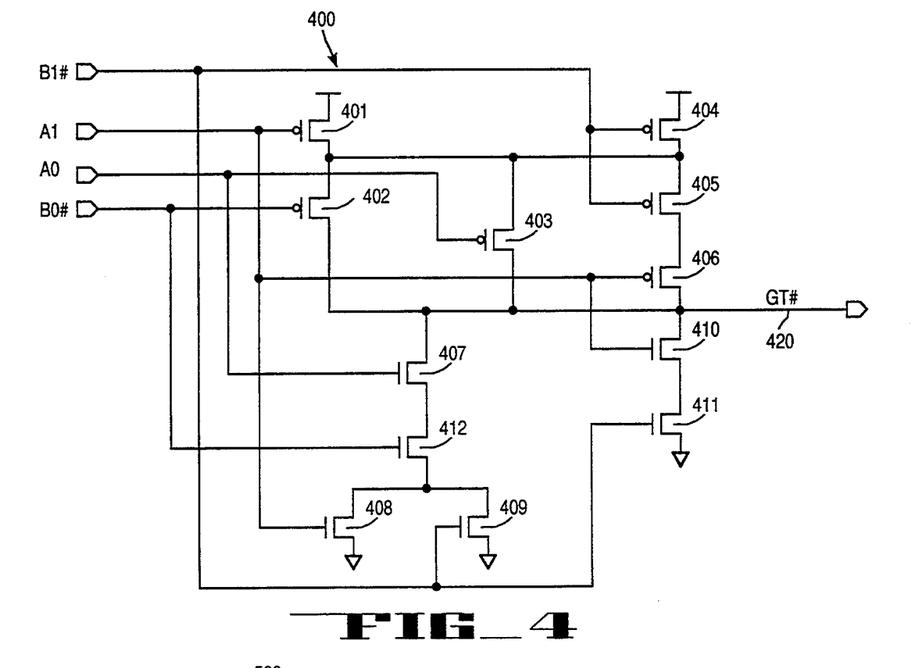
FIG. 4 illustrates one embodiment of a circuit schematic for generating a signal indicative of whether one 2-bit input is greater than another 2-bit input.

FIG. 4 is a circuit schematic of one embodiment of the 2-bit greater than comparison subcircuits 202, 204, 206 and 208. The 2-bit greater than comparison subcircuits indicates whether the input signals A0 and A1 are greater than the input signals B0 and B1. Referring to FIG. 4, subcircuit 400 comprises p-channel transistors 401–406 and n-channel transistors 407–412. In one embodiment, PMOS transistors 401 and 404–406 have a channel width of 10.7 microns and a channel length of 0.7 microns, while NMOS transistors 407–409 and 412 have a channel width of 4.4 microns and a channel length of 0.7 microns. Also, PMOS transistors 402 and 403 have a channel width and length of 7.3 and 0.7 microns respectively, and NMOS transistors 410 and 411 have a channel width and length of 3.1 and 0.7 microns respectively.

Transistor 401 is coupled in series with transistor 402. The source of transistor 401 is coupled to the supply voltage Vcc and the drain of transistor 402 is coupled to the greater than indication signal 420. The gate of transistor 401 is coupled to the A1 input signal, and the gate of transistor 402 is coupled to the B0# input signal. The source of transistor 403 is coupled to the drains of transistors 401 and 404. The drain of transistor 403 is coupled to the greater than indication signal 420. The gate of transistor 403 is coupled to the A0 input signal.

Transistors 404–406 are coupled in series with the source of transistor 404 coupled to the supply voltage Vcc and the drain of transistor 406 coupled to the greater than indication signal 420. The gates of transistors 404 and 405 are coupled to the B1# input signal. The gate of transistor 406 is coupled to the A1 input signal. N-channel transistors 407 and 412 are coupled in series. The drain of transistor 407 is coupled to the greater than indication signal 420. The source of transistor 412 is coupled to the drains of both transistors 408 and 409. The gate of transistor 407 is coupled to the A0 input signal. The gate of transistor 412 is coupled to the B0# input signal. The sources of transistor 408 and 409 are coupled to ground (Vss). The gate of transistor 408 is coupled to the A1 input signal. The gate of transistor 409 is coupled to the B1# input signal. Transistors 410 and 411 are coupled in series between ground and the greater than indication signal 420. The source of transistor 411 is coupled to ground. The gate of transistor 411 is coupled to the B1# input signal. The drain of transistor 410 is coupled to the greater than indication signal 420, and the gate of transistor 410 is coupled to A1 input signal.

The 2-bit greater than comparison subcircuit 400 determines whether the input bits A0 and A1 are greater than the input bits B0 and B1. When the input bits A0 and A1 are greater than the input bits B0 and B1, the greater than indication signal 420 is pulled to a logical 0. On the other hand, when the input signals A0 and A1 are not greater than the input signals B0 and B1, the greater than indication signal 420 is pulled to a logical 1 (i.e., pulled to Vcc). For instance, if A0, A1, B0 and B1 are all zeroes (such that they are all equal), transistor 401 in conjunction with transistor 403 pulls the greater than output indication signal 420 high, while turning off certain NMOS transistors to ensure that the greater than output indication signal 420 is not pulled to ground. On the other hand, if A0=1, A1=1, B0=0 and B1=0 (indicating that A1 and A0 are greater than B1 and B0), then transistor 408, 412 and 407 act to pull the greater than output indication signal 420 to ground, thereby indicating that the input signals A0 and A1 are greater than the input signals B0 and B1.

Because the output is active low, the number of gates required to implement the 2-bit greater than comparison is lower than that of the prior art.

Figure 5:
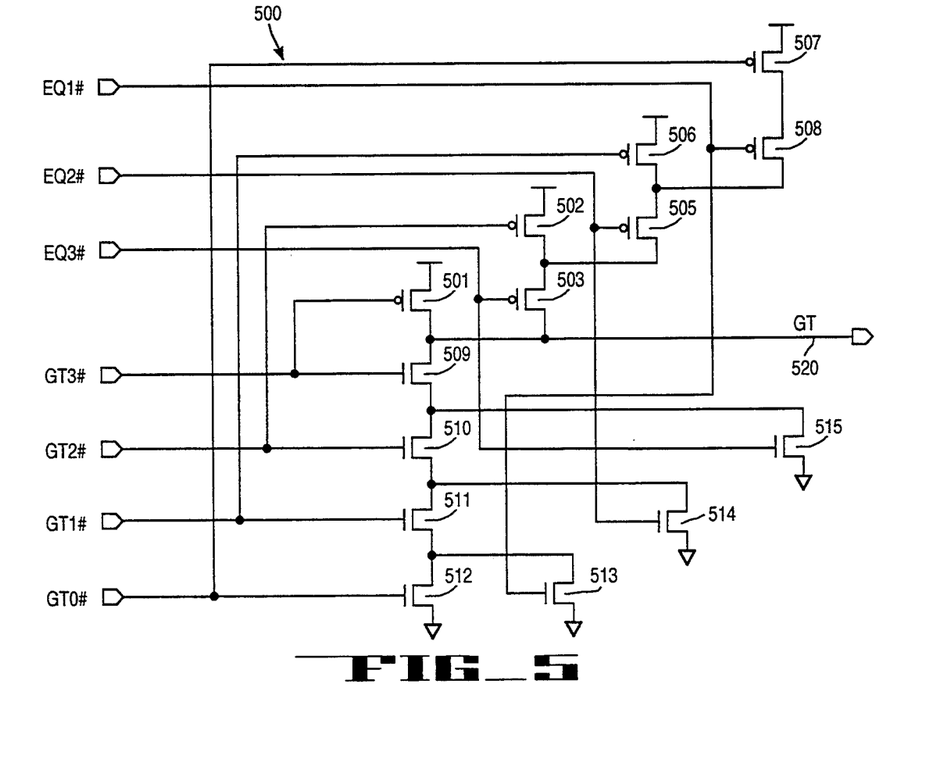
FIG. 5 illustrates one embodiment of a circuit schematic for generating a signal indicative of a greater than comparison between two sets of inputs.

One embodiment of the greater than summation circuit 210 described in FIG. 2 is shown in FIG. 5. Referring to FIG. 5, summation circuit 500 includes PMOS transistors 501-508 and NMOS transistors 509-515. In one embodiment, NMOS transistors 509-513 have a channel width of 5.7 microns and a channel length of 0.7 microns. Also PMOS transistor 501 has a channel width and length of 3.9 and 0.7 microns respectively, while PMOS transistor 502 has a channel width and length of 7.3 and 0.7 microns respectively. PMOS transistors 503, 505, 506, 507 and 508 have channel widths of 14.1, 14.1, 10.7, 14.1 and 14.1 microns respectively, while they have a channel length of 0.7 microns. NMOS transistors 513-515 have channel widths of 5.7, 4.4 and 3.1 microns respectively, while they have a 0.7 micron channel length.

The source of transistor 501 is coupled to the supply voltage Vcc, and the drain of transistor 501 is coupled to the greater than indication signal 520 of subcircuit 500. The gate of transistor 501 is coupled to GT3# input signal. Transistors 503 and 502 are coupled in series between the supply voltage and the greater than output indication signal 520 with the source of transistor 502 coupled to the supply voltage Vcc and the gate of transistor of 502 coupled to the GT2# input signal. The drain of transistor 503 is coupled to the greater than output indication signal 520. The gate of transistor 503 is coupled to the EQ3# input signal. Transistors 506 and 505 are coupled in series, wherein the source of transistor 506 is coupled to the supply voltage Vcc and the drain of the transistor 505 is coupled to the drain of transistor 502 and the source of transistor 503. The gate of transistor 505 is coupled to the EQ2# input signal and the gate of transistor 506 is coupled to the GT1# input signal. Transistors 507 and 508 are coupled in series wherein the source of transistor 507 is coupled to the supply voltage, and the drain of transistor 508 is coupled to the drain of transistor 506 and the source of transistor 505. The gate of transistor 507 is coupled to the GT0# input signal and the gate of transistor 508 is coupled to the EQ1# input signal.

Transistors 509-512 are coupled in series between ground and the greater than output indication signal 520, with the source transistor 512 coupled to ground and the drain of transistor 509 coupled to the greater than output indication signal 520. The gate of transistor 509 is coupled to the GT3# input signal. The gate of transistor 510 is coupled to the GT2# input signal. The gate of transistor 511 is coupled to the GT1# input signal and the gate of transistor 512 is coupled to the GT0# input signal. The drain of transistor 515 is coupled to the source of transistor 509. The source of transistor 515 is coupled to ground and the gate of transistor 515 is coupled to the EQ3# input signal. The source and drain of transistor 514 are coupled to ground and the source of transistor 510 respectively. The gate of transistor 514 is coupled to the EQ2# input signal and the source and drain of transistor 514 are coupled to the ground and the source of transistor 510 respectively. The gate of transistor 513 is coupled to the EQ1# input signal. The source of transistor 513 is coupled to ground and the drain is coupled to the source of transistor 511.

Subcircuit 500 receives the equal indication signals 233, 235 and 237 output from comparator subcircuit 203, 205 and 207 on its EQ1-3# input signals respectively. Subcircuit 500 also receives the greater than indication signals 232, 234, 236 and 238 output from comparator subcircuits 202, 204, 206 and 208 on its GT0-3# input signals respectively. Since each of the signals are active low, an equal indication signal being low indicates that the 2-bits of number A being compared with the two bits of number B are equal. This causes its corresponding p-channel device to turn on that is coupled to the equal indication signal and the corresponding n-channel device to which it is coupled to turn off. If the two bits of number A are greater than those of number B, then its corresponding greater than indication signal is at to a logical 0, causing the n-channel devices (e.g., 509-512) to be off, and the p-channel device (e.g., 501, 502, 506 or 507) to be on. On the other hand, if the two bits of input A are not greater than the bits of input B, then the greater than indication signal 520 is pulled to ground, thereby indicating that the 8-bits of input A are not greater than the 8 bits of number B.

Figure 6:
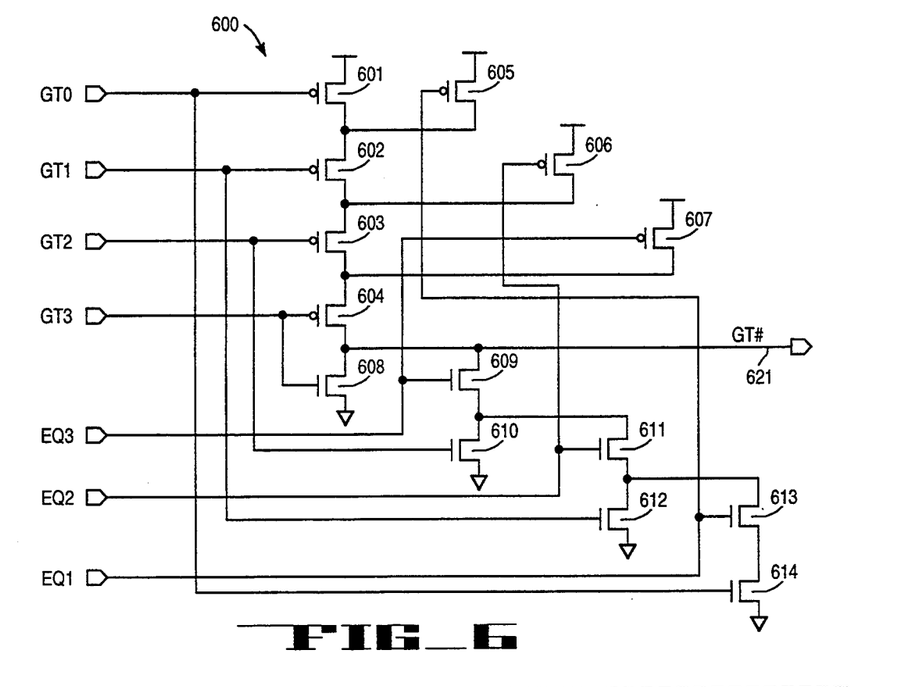
FIG. 6 illustrates one embodiment of a circuit schematic for generating a composite greater-than signal using the results of multiple comparisons.

FIG. 6 illustrates one implementation of the greater than summation logic 106 of FIG. 1. Referring to FIG. 6, summation logic 600 comprises p-channel transistors 601-607 and n-channel transistors 608-614. In one embodiment, transistors 601-614 have a channel length of 0.7 microns and channel width of 14.1, 14.1, 14.1, 14.1, 14.1, 10.7, 7.3, 1.8, 5.7, 3.1, 5.7, 4.4, 5.7, 5.7 microns respectively.

Transistors 601-604 are coupled in series between the supply potential Vcc and the greater than (GT#) indication signal. The source of transistor 601 is coupled to a supply voltage Vcc and the drain of transistor 604 is coupled to the greater than indication signal 621. The gate of transistor 601 is coupled to the greater than input signal GT0. The gate of transistor 602 is coupled to the greater than input signal GT1. The gate of transistor 603 is coupled to the greater than input signal GT2 and the gate of transistor 604 is coupled to the greater than input signal GT3. The sources of transistors 605-607 are coupled to the supply voltage Vcc. The drains of transistors 605-607 are coupled to the sources of transistors 602-604 respectively. The gates of transistors 605-607 are coupled to the equal inputs EQ-1-EQ3 respectively. The source of transistor 608 is coupled to ground. The drain of transistor 608 is coupled to the greater than indication signal 621, and the gate of transistor 608 is coupled to the greater than input signal GT3. Transistors 609 and 610 are coupled in series. The source of transistor 610 is coupled to ground while the drain of transistor 609 is coupled to the greater than indication signal 621. The gate of transistor 609 is coupled to the equal input signal EQ3, and the gate of transistor 610 is coupled to the greater than input signal GT2. Transistors 612 and 611 are coupled in series with the source of transistor 612 coupled to ground and the drain of transistor 611 coupled to the source of transistor 609. The gate of transistor 611 is coupled to the equal indication input signal EQ2. The gate of transistor 612 is coupled to the greater than indication input signal GT1. Transistors 614 and 613 are coupled in series with the source of transistor 614 coupled to ground and the drain of transistor 613 coupled to the source of transistor 611. The gate of transistor 613 is coupled to the equal indication input signal EQ1, and the gate of transistor 614 is coupled to the greater than indication input signal GT0

In the present invention, the input signals GT3 and EQ3 are the outputs from comparator block 104;the input signals GT2 and EQ2 are the outputs from comparator block 103, the input signals GT1 and EQ1 are the outputs form comparator block 102, and the input signal GT0 is an output from comparator block 101. When the greater than indication signal, GT3, is a logical 1 (indicating that bits 31–24 of number A are greater than the 31–24 bits of number B), transistor 608 is turned on and pulls the output GT# signal 621 low. This indicates that number A is greater than number B. If the input signal GT3 is low (indicating that bits 31–24 of number A are not greater than bit 31–24 of number B), then transistor 604 is on and transistor 608 is off. If the input signal EQ3 is a logical 1 (indicating that bits 31–24 of number A and B are equal), then transistor 609 is turned on and transistor 607 is off. However, if the input signal EQ3 and the input signal GT3 are a logical 0, then transistors 607 and 604 pull the GT# signal 621 high, indicating that number A is not greater-than-or-equal-to number B.

If the GT2 input signal is logical 1 (indicating that bits 23–16 of number A are greater than bits 23–16 of number B) and signals GT3 and EQ3 are logical 0 and a logical 1 respectively, then transistors 609 and 610 are turned on, causing the GT# signal 621 to be brought to a logical 1 indicating that number A is greater than number B.

If signal GT1 is a logical 1 (indicating that bits 15–8 of number A are greater than bits 15–8 of number B) and signals GT3, GT2, EQ3 and EQ2 are a logical 0, a logical 0, a logical 1, and a logical 1 respectively, then the transistors 609, 611 and 612 are turned on to cause the GT# signal 621 to be brought low.

If signal GT0 is a logical 1 (indicating that bits 7–0 of number A are greater than bits 7–0 of number B), while signals GT1-3 are at a logical 0 and signals EQ1-3 are at a logical 1, then transistors 614, 613, 611, and 609 are on, causing the GT# signal 621 to be pulled to a logical 0.

If at any time one of the equal indicator signal inputs EQ1-3 is low, while the corresponding greater than indication and all of the greater than indications for bits in more significant bit positions are a logical 0, then the GT# signal 621 is pulled to a logical 1 to indicate that number A is not greater than number B.

Overview of the Computer System of the Present Invention

Figure 7:
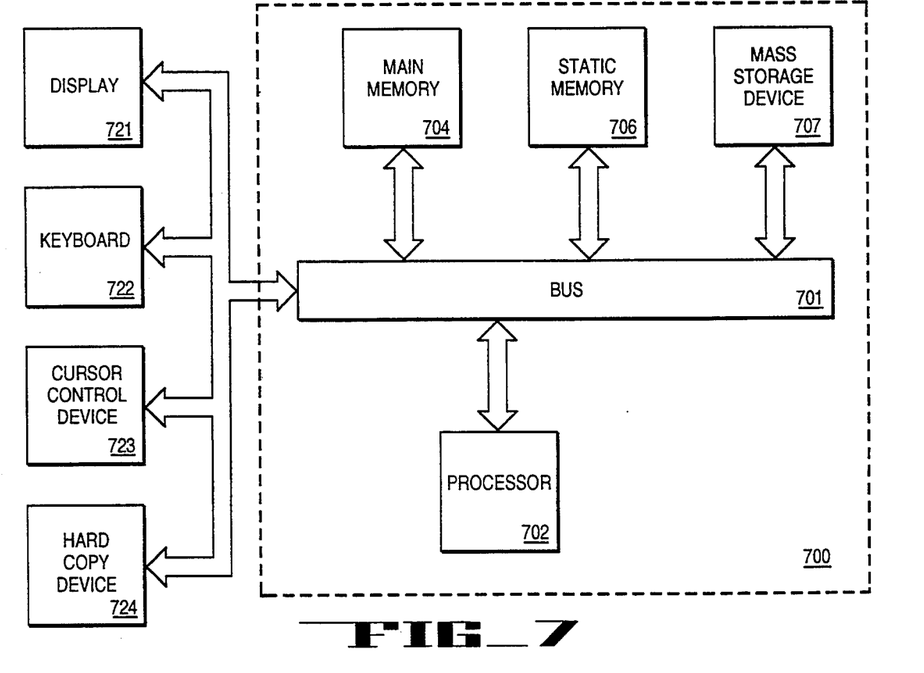
FIG. 7 illustrates one embodiment of a computer system of the present invention.

Referring to FIG. 7, an overview of a computer system of the present invention is shown in block diagram form. It will be understood that while FIG. 7 is useful for providing an overall description of the computer system of the present invention, a number of details of the system are not shown. Further, the present invention is described with reference to its preferred embodiment; alternative embodiments which may be conceived by one of ordinary skill in the art are considered within the scope of the claims set forth below.

As illustrated in FIG. 7, a computer system, as may be utilized by the preferred embodiment of the present invention, generally comprises a bus or other communications means 701 for communicating information, a processor 702 coupled with bus 701 for processing information, a random access memory (RAM) or other dynamic storage device 704 (commonly referred to as a main memory) coupled with bus 701 for storing information and instructions for processor 702, a read only memory (ROM) or other static storage device 706 coupled with bus 701 for storing static information and instructions for processor 702, a data storage device 707, such as a magnetic disk and disk drive, coupled with bus 701 for storing information and instructions. Note that in the currently preferred embodiment, processor 702 comprises an Intel Architecture Microprocessor manufactured by Intel Corporation of Santa Clara, Calif.

The computer system also includes a display device 721, such as a cathode ray tube, liquid crystal display, etc., coupled to bus 701 for displaying information to the computer user, an alphanumeric input device 722 including alphanumeric and other keys, etc., coupled to bus 701 for communicating information and command selections to processor 702 and a cursor control device 723 coupled to bus 701 for controlling cursor movement. The computer system may include a tablet or other pen-based input device. Moreover, the system includes a hard copy device 724, such as a plotter or printer, for providing a visual representation of the computer images. Hard copy device 724 is coupled with processor 702, main memory 704, static memory 706 and mass storage device 707 through bus 701.

The computer system also includes control logic 703 coupled to bus 701 and processor 702 for powering up and powering down processor 702 upon the occurrence of one or more predetermined events. In one embodiment, control logic 703 monitors processor 702 to determine if a predetermined instruction has been executed, such that one of the results of execution is the powering down of processor 702.

Of course, certain implementations and uses of the present invention may not require nor include all of the above components. For example, in certain implementations a keyboard and cursor control device for inputting information to the system may not be required. In other implementations, it may not be required to provide a display device for displaying information.

In one embodiment, the present invention is used to monitor the address bus of the computer system for a given range of addresses. In this case, if the address is within an address range specified by an upper address and a lower address, then a signal is generated. Address monitoring may be required in a computer system, for example, to identify whether the current bus transaction is directed at an input/output (I/O) device at a specific address. In another embodiment, address monitoring may be used when trapping bus transactions to a specific address range is desired in order to, for example, produce an interrupt.

Figure 8:
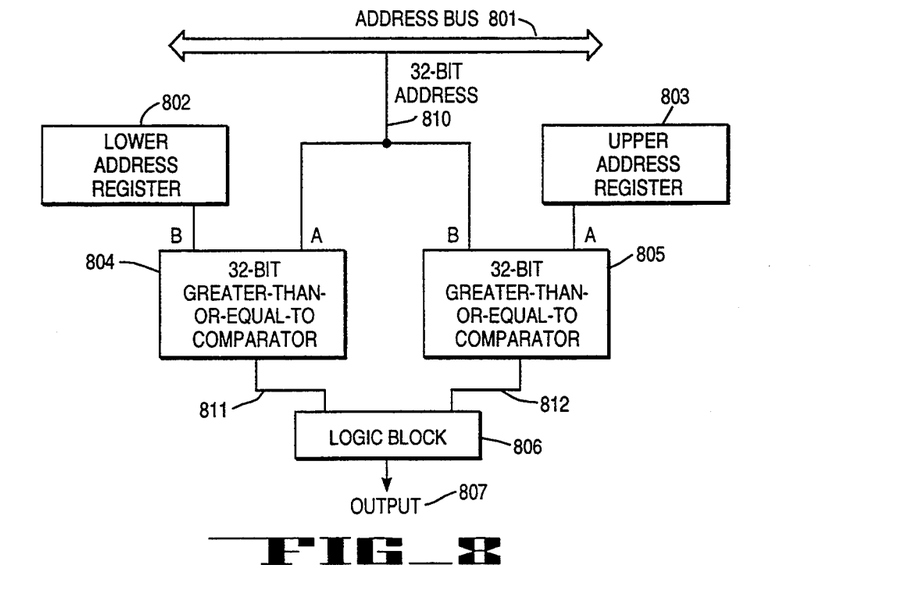
FIG. 8 illustrates one example of the use of the comparison circuitry of the present invention.

An example of such an address monitoring implementation is shown in FIG. 8. Referring to FIG. 8, address bus 801 is shown for use in transferring addresses in the computer system. In one embodiment, each address is a 32-bit address. One specific 32-bit address, address 810, is shown being input into input A of the 32-bit greater-than-or-equal-to comparator 804 and input B of the 32-bit greater-than-or-equal-to comparator 805. An address stored in a lower address register 802 is coupled to input B of the 32-bit greater-than-or-equal-to comparator 804. Another address stored in the upper address register 803 is coupled to the A input of the 32-bit greater-than-or-equal-to comparator 805. The outputs of 32-bit greater-than-or-equal-to comparators 804 and 805 (signals 811 and 812 respectively) are coupled to logic block 806 which produces an output 807 indicative of the comparisons performed by the 32-bit greater-than-or-equal-to comparators 804 and 805.

The comparator system shown in FIG. 8 compares a 32-bit address 810 with a lower address stored in lower address register 802 and an upper address stored in upper address register 803 to determine if the 32-bit address is between the lower address and the upper address. The addresses in registers 802 and 803 may be programmed to contain the lower and upper addresses of the address range respectively. In another embodiment, the addresses in registers 802 and 803 may be hard-wired.

In the present invention, the 32-bit greater-than-or-equal-to comparators 804 and 805 are identical. However, their inputs have been reversed with respect to the 32-bit address 810 and the address to which it is being compared (the lower address or the upper address). The 32-bit greater-than-or-equal-to comparator 804 compares the 32-bit address 810 with the lower address received on its B input from lower address register 802 and determines whether the 32-bit address 810 is greater-than-or-equal-to the lower address. If so, comparator 804 brings output sign to a logical 1, thereby indicating that the 32-bit address 810 is greater-than-or-equal-to the lower address stored in the lower address register 802. If not, then comparator 804 outputs signal 811 as a logical 0 to indicate that address 810 is not greater-than-or-equal-to the lower address.

On the other hand, 32-bit greater-than-or-equal-to comparator 805 compares the upper address received on input A from upper address register 803 with a 32-bit address 810 and determines if the upper address is greater-than-or-equal-to 32-bit address 810. If so, the output signal 812 is output from comparator 805 as a logical 1, thereby indicating that the 32-bit address 810 is below the upper address. If not, then comparator 805 outputs signal 812 as a logical 0. Therefore, by simply switching the inputs, the greater-than-or-equal-to comparator of the present invention may act as a less-than-or-equal-to comparator. It should be noted that comparators 804 and 805 may be designed to produce signals at a logical 0 level if the results of the greater-than-or-equal-to comparisons are true.

Logic block 806 receives both output signals 811 and 812 and using their logical values (e.g., logical 0, logical 1, etc.) determines whether the 32-bit address 810 is within the range of the lower address and the upper address. If both output signals 811 and 812 are logical 1's, then logic block 806 produces output signal 807 at a logical 1 to indicate that the address 810 is within the address range. If either of output signals 811 and 812 is at a logical 0, then logic block 806 produces output signal 807 as a logical 0 to indicate that the range address 810 is not within the address range. In one embodiment, logic 806 could be an AND gate. Therefore, when the output of logic block 806 is a logical 1, the 32-bit address on address bus 801 is determined to be within a range specified by the user.

The comparator of the present invention could also be used in arithmetic logic units to implement the "greater-than-or-equal-to" function and also the "less-than-or-equal-to" function. These arithmetic logic units may be found in the processor of a computer system. These functions are executed by an ALU during the execution of a program having multiple instructions.

Figure 9:
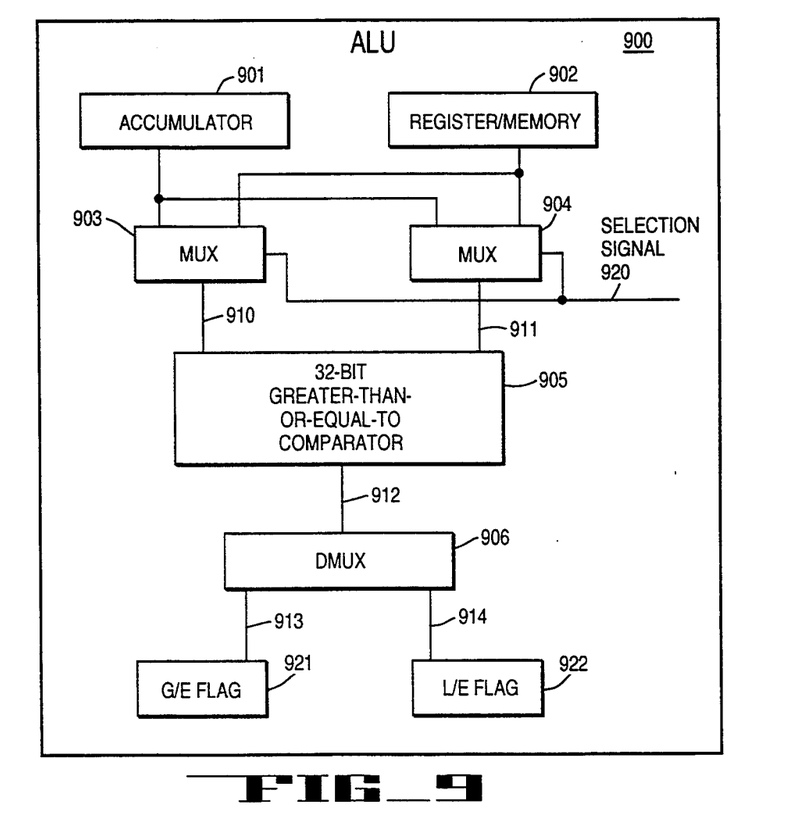
FIG. 9 illustrates another use of the comparison circuitry of the present invention.

An example of a portion of an ALU is shown in FIG. 9. Referring to FIG. 9, an accumulator 901 stores results of an accumulation operation performed within the ALU. Such an accumulation operation is well-known in the art. Both the value in the accumulator 901 and the value in the register/memory location 902 are received by multiplexers (MUXs) 903 and 904. One the values is output from multiplexer 903 on signal path 910 to 32-bit greater-than-or-equal-to comparator 905. The other input of comparator 905 is coupled to the output of multiplexer 904 via signal path 911. Multiplexers 903 and 904 are controlled by a selection signal 920 which selects the outputs of MUXs 903 and 904 to be either the value in accumulator 901 or the value from the register/memory location 902. In one embodiment, the selection is based on whether comparator 905 is performing a test of A greater-than-or-equal-to B function or a test of B greater-than-or-equal-to A function with respect to the values. If the selection signal 920 is in a first logic state (e.g., a logical 0), the MUX 903 outputs the value from the accumulator 901 on signal path 910 and MUX 904 outputs the value from register 902 on signal path 911. However, if the control signal is in a second logic state (e.g., a logical 1), MUX 903 outputs the value from register 902 on signal path 910, while MUX 904 outputs the value from accumulator 901 on signal path 911.

Comparator 905 is coupled to receive the outputs of MUXs 903 and 904. Comparator 905 determines if the value on signal path 910 is greater-than-or-equal-to the value on signal path 911 and generates the output on signal path 912 indicative of the result. In one embodiment, if the value on signal path 910 is greater-than-or-equal-to the value on signal path 911, then comparator 905 outputs signal 912 in a first logic state, such as at a logical 1; if the value on signal path 910 is not greater-than-or-equal-to the value on signal path 911, then comparator 305 outputs signal 912 at a logical 0.

Signal path 912 is coupled to the input of a demultiplexer (DMUX) 906. The output signal 912 in conjunction with DMUX 906 sets either the greater-than-or-equal-to flag 921 or a less-than-or-equal-to flag 922. In one embodiment, DMUX 906 is controlled by the same control signal and controls MUX 903 and 904. If the control signal is in a first logic state, the output 912 from comparator 905 is used to set the greater-than-or-equal-to flag 921. If the control signal is in a second logic state, the output 912 from comparator 905 is used to set the less-than-or-equal-to flag 922. In this manner, the comparator of the present invention may be used in an ALU to provide a greater-than-or-equal-to function or a less-than-or-equal-to function.

For instance, if during the execution of a program, ALU 900 is to determine if the value in accumulator 901 is greater-than or equal-to the value in register 902, then selection signal 920 causes MUX 903 to output the value from accumulator 901 and MUX 904 to output the value from register 902 to comparator 905 for comparison. If comparator 905 determines that the value from accumulator 901 is greater-than or equal to the value from register 902, then signal 912 is output at a logical 1. The same selection signal then causes the greater-than-or-equal-to flag 921 to be set. If the value from accumulator 901 is less than the value from register 902, the signal 912 is output at a logical 0, and flag 921 is not set. Using this flag information, the program can complete its operation.

Similarly, if during the execution of a program, ALU 900 is to determine if the value in accumulator 901 is less-than or equal to the value in register 902, then the selection signal 920 causes MUX 903 to output the value from register 902 and causes MUX 904 to output the value from accumulator 901. If computer 905 determines that the value from register 902 is greater than or equal to the value from accumulator 901, then signal 912 is output at a logical 1, and DMUX directs the less than flag 922 to be set. On the other hand, if comparator 905 determines that value from register 902 is not greater than or equal to the value in accumulator 901, than signal 912 is output at a logical 0 and the less than flag is not set. Using the flag information, the program continues its execution.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a method and apparatus for comparing two binary numbers has been described.

I claim:

1. An apparatus for comparing a first n-bit number and a second n-bit number comprising:
    a first circuit producing a first plurality of equal indication signals and a first plurality of greater-than indication signals, wherein the first circuit means includes a plurality of first sub-circuit means, each of the plurality of first sub-circuit means for producing one of the plurality of equal indication signals and one of the plurality of greater-than indication signals in response to m-bits of said first n-bit number and m-bits of said second n-bit number;
    a second circuit coupled to the first circuit to produce a final equal indication signal in response to the first plurality of equal indication signals, wherein the final equal indication signal indicates whether the first n-bit number is equal to the second n-bit number;
    a summation logic coupled to the first circuit to produce a final greater-than indication signal in response to the first plurality of greater-than indication signals and a plurality of the first plurality of equal indication signals; and
    a third circuit coupled to the second circuit and summation logic to produce a third signal indicating whether the first n-bit number is greater than or equal to the second n-bit number in response to the final equal indication signal and the final greater-than indication signal.

2. The apparatus defined in claim 1 wherein the third circuit comprises NAND gate.

3. The apparatus defined in claim 1 wherein the second circuit includes a NOR gate.

4. The apparatus defined in claim 1 wherein m comprises 8, such that said one of the plurality of equal indication signals and said one of the plurality of greater-than indication signals are produced in response to 8-bits of said first n-bit number and 8-bits of said second n-bit number.

5. The apparatus defined in claim 1 wherein each of the plurality of first sub-circuit means includes a plurality of k-bit equal comparison sub-circuits and a plurality of k-bit greater-than comparison sub-circuits, each of the first plurality of k-bit equal comparison sub-circuits producing one of a second plurality of equal indication signals in response to k of the m-bits of the first n-bit number and k of the m-bits of the second n-bit number, and wherein each of the first plurality of k-bit greater-than comparison sub-circuits produces one of a second plurality of greater-than indication signals in response to k of the m-bits of the first n-bit number and k of the m-bits of the second n-bit number, and further wherein each of the plurality of first sub-circuit means includes output circuitry producing one of the first plurality of equal indication signals and one of the first plurality of greater-than indication signals in response to the second plurality of equal indication signals and the second plurality of greater-than indication signals.

6. The apparatus defined in claim 5 wherein k comprises 2, such that the plurality of first sub-circuit means includes a plurality of 2-bit equal comparison sub-circuits and a plurality of 2-bit greater-than comparison sub-circuits.

7. The apparatus defined in claim 1 wherein m comprises 1.

8. An apparatus for comparing a first n-bit number and a second n-bit number comprising:
    first circuit means for producing a first plurality of equal indication signals and a first plurality of greater-than indication signals, wherein the first circuit means includes a plurality of first sub-circuit means for producing one of the plurality of equal indication signals and one of the plurality of greater-than indication signals in response to m-bits of said first n-bit number and m-bits of said second n-bit number, wherein each of the plurality of first sub-circuit means includes
        a plurality of k-bit equal comparison sub-circuits and a plurality of k-bit greater-than comparison sub-circuits, each of the first plurality of k-bit equal comparison sub-circuits for producing one of a second plurality of equal indication signals in response to k of the m-bits of the first n-bit number and k of the m-bits of the second n-bit number, and wherein each of the first plurality of k-bit greater-than comparison sub-circuits for producing one of a second plurality of greater-than indication signals in response to k of the m-bits of the first n-bit number and k of the m-bits of the second n-bit number, and further wherein each of the plurality of first sub-circuit means includes circuit means for producing one of the first plurality of equal indication signals and one of the first plurality of greater-than indication signals in response to the second plurality of equal indication signals and the second plurality of greater-than indication signals;
    second circuit means for producing a final equal indication signals in response to the first plurality of equal indication signals, wherein the final equal indication signal indicates whether the first n-bit number is equal to the second n-bit number;
    third circuit means for producing a final greater-than indication signal in response to the first plurality of greater-than indication signals and at least one of the first plurality of equal signals; and
    fourth circuit means for producing a third signal indicating whether the first n-bit number is greater than or equal to the second n-bit number in response to the final equal indication signal and the final greater-than indication signal.

9. The apparatus defined in claim 8 wherein k comprises 2, such that the plurality of first sub-circuit means includes a plurality of 2-bit equal comparison sub-circuits and a plurality of 2-bit greater-than comparison sub-circuits.

10. The apparatus defined in claim 8 wherein the fourth circuit means includes NAND gate.

11. The apparatus defined in claim 8 wherein the second circuit means includes a NOR gate.

12. The apparatus defined in claim 8 wherein m comprises 8, such that said one of the plurality of equal indication signals and said one of the plurality of greater-than indication signals are produced in response to 8-bits of said first n-bit number and 8-bits of said second n-bit number.

13. The apparatus defined in claim 8 wherein the first circuit means includes 4 first sub-circuit means and m and n comprise 8 and 32 respectively, such that each of the 4 first sub-circuit means produces one of the plurality of equal indication signals and one of the plurality of greater-than indication signals in response to 8-bits of said first 32-bit number and 8-bits of said second 32-bit number.

14. A computer system comprising a bus means for transferring information, processing means coupled to the bus means for executing a plurality of instructions, memory means coupled to the bus means for storing data and instructions for use by the processing means and an address range comparison means coupled to the bus for determining if a first address on the bus means is within the address range defined by a lower address and an upper address, wherein the address range comparison means includes:

first comparison means for producing a first signal indicative of whether the first address is greater-than or equal to the lower address, wherein the first comparison means includes a first input and a second input for receiving the lower address and the first address respectively and outputs the first signal in a first logic state if the first address is greater-than or equal to the lower address and outputs the first signal in a second logic state if the first address is not greater-than or equal to the lower address;

second comparison means for producing a second signal indicative of whether the upper address is greater-than or equal to the first address, wherein the second comparison means includes a first input and a second input for receiving the first address and the upper address respectively and outputs the second signal in a third logic state if the upper address is greater-than or equal to the first address and outputs the second signal in a fourth logic state if the upper address is not greater-than or equal to the first address; and circuit means coupled to the first comparison means and the second comparison means for generating a third signal indicative whether the first address within the address range, wherein the third signal is in a first logic state if the first address is within the address range and a second logic state if the first address is not within the address range, wherein the first comparison means and the second comparison means includes first circuit means for producing a first plurality of equal indication signals and a first plurality of greater-than indication signals, wherein the first circuit means includes a plurality of first sub-circuit means for producing one of the plurality of equal indication signals and one of the plurality of greater-than indication signals in response to m-bits of said first n-bit number and m-bits of said second n-bit number, wherein each of the plurality of first sub-circuit means includes a plurality of k-bit equal comparison sub-circuits and a plurality of k-bit greater-than comparison sub-circuits, each of the first plurality of k-bit equal comparison sub-circuits for producing one of a second plurality of equal indication signals in response to k of the m-bits of the first n-bit number and k of the m-bits of the second n-bit number, and wherein each of the first plurality of k-bit greater-than comparison sub-circuits for producing one of a second plurality of greater-than indication signals in response to k of the m-bits of the first n-bit number and k of the m-bits of the second n-bit number, and further wherein each of the plurality of first sub-circuit means includes circuit means for producing one of the first plurality of equal indication signals and one of the first plurality of greater-than indication signals in response to the second plurality of equal indication signals and the second plurality of greater-than indication signals;

second circuit means for producing a final equal indication signals in response to the first plurality of equal indication signals, wherein the final equal indication signal indicates whether the first n-bit number is equal to the second n-bit number;

third circuit means for producing a final greater-than indication signal in response to the first plurality of greater-than indication signals and at least one of the first plurality of equal signals; and fourth circuit means for producing a third signal indicating whether the first n-bit number is greater than or equal to the second n-bit number in response to the final equal indication signal and the final greater-than indication signal.

* * * * *

UNITED STATES PATENT AND TRADEMARK OFFICE
CERTIFICATE OF CORRECTION

PATENT NO.   : 5,450,056
DATED        : September 12, 1995
INVENTOR(S)  : Jens

It is certified that error appears in the above-identified patent and that said Letters Patent is hereby corrected as shown below:

In column 8, at line 6, insert --205,-- between "203," and "and".

In column 15, at line 19, delete "sign" and substitute --signal 811--.

Signed and Sealed this

Thirty-first Day of December, 1996

*Attest:*

BRUCE LEHMAN

*Attesting Officer*      *Commissioner of Patents and Trademarks*